(12) United States Patent
Hutchinson et al.

(10) Patent No.: US 11,290,212 B2
(45) Date of Patent: Mar. 29, 2022

(54) METHODS, APPARATUSES AND SYSTEMS FOR TIME DELAY ESTIMATION

(71) Applicant: The Government of the United States, as represented by the Secretary of the Navy, Washington, DC (US)

(72) Inventors: Meredith N. Hutchinson, Washington, DC (US); Jonathan M. Nichols, Crofton, MD (US); Gustavo K. Rohde, Crozet, VA (US); Nicole Menkart, Potomac, MD (US); Geoffrey A. Cranch, Fairfax Station, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/905,842

(22) Filed: Jun. 18, 2020

(65) Prior Publication Data

US 2021/0281361 A1 Sep. 9, 2021

Related U.S. Application Data

(60) Provisional application No. 62/862,945, filed on Jun. 18, 2019.

(51) Int. Cl.
*H04W 24/00* (2009.01)
*H04L 1/06* (2006.01)
(52) U.S. Cl.
CPC .......... *H04L 1/0681* (2013.01); *H04L 1/0631* (2013.01)

(58) Field of Classification Search
CPC ......... G05D 1/0242; G05D 2201/0203; G05D 2201/0215; B25J 11/0085; A47L 11/4061; A47L 11/4066; A47L 2201/04; G01S 5/021; G01S 5/0252; G01S 5/02; G01S 5/0205; G01S 1/026; G01S 5/0278; G01S 5/0263; G01S 5/0009; G01S 5/10; G01S 5/0257; G01S 1/028; G01S 5/0054; G01S 2205/008; G01S 5/0018; G01S 5/06; G01S 2205/006; H04W 64/00; H04W 4/029; H04W 88/005
See application file for complete search history.

(56) References Cited

U.S. PATENT DOCUMENTS 10,438,302 B2 * 10/2019 Bedoya .................. G06Q 50/02
2005/0281363 A1 * 12/2005 Qi .......................... H04W 64/00
375/349

(Continued)

*Primary Examiner* — Jung Liu
(74) *Attorney, Agent, or Firm* — U.S. Naval Research Laboratory (57) ABSTRACT

Methods, apparatuses, and systems for calculating time delays by a Wasserstein approach are provided. A plurality of signals are recorded by a plurality of sensors (three or more), respectively, and received at a controller. The plurality of signals recorded by the plurality of sensors are generated in response to a signal emitted by a source. The plurality of signals are converted into a plurality of probability density functions. A cumulative distribution transform for each of the plurality of probability density functions is calculated. A time delay for each unique pair of the plurality of sensors is calculated by minimizing a Wasserstein distance between two cumulative distribution transforms corresponding to the unique pair of the plurality of sensors.

17 Claims, 7 Drawing Sheets

(56) References Cited

U.S. PATENT DOCUMENTS

| | | | | |
|---|---|---|---|---|
| 2012/0190380 A1* | 7/2012 | Dupray | ............... | G01S 5/021 |
| | | | | 455/456.1 |
| 2013/0172019 A1* | 7/2013 | Youssef | ............ | G01S 5/0215 |
| | | | | 455/456.6 |
| 2013/0172020 A1* | 7/2013 | Aweya | ............... | G01S 5/0252 |
| | | | | 455/457 |
| 2015/0185031 A1* | 7/2015 | Davidson | ........... | G01C 21/34 |
| | | | | 701/527 |
| 2016/0103451 A1* | 4/2016 | Vicenti | ........... | A47L 11/4061 |
| | | | | 700/259 |

* cited by examiner

METHODS, APPARATUSES AND SYSTEMS FOR TIME DELAY ESTIMATION

BACKGROUND

Field of the Invention

The present application relates generally to time delay distance estimation.

Description of Related Art

Time delay estimation (TDE) is an important step in the process of source localization. It is known that an emitted signal will travel through a medium and reach one or more spatially distributed sensors or receivers at times that are proportional to the distance traveled. In general, accurate estimates of the relative arrival times will provide accurate estimates of the source location. Conventional approaches to obtaining estimates of arrival times seek to calculate a time delay that maximizes some measure of similarity between received and reference signals. These conventional approaches are often tailored to an assumed noise model (e.g., follow the principle of maximum likelihood) and include maximizing the cross-correlation, minimizing the magnitude of the difference between observed and reference signals, and maximizing the average mutual information function. Each of these approaches, however, assumes that the only difference between the template signal and the observation is the time delay and some noise. But those assumptions lead to an incomplete model because they fail to account for a morphed version of the original signal that occurs when the dynamics of the medium alter the original signal during transit. Examples of such morphing may be seismological vibrations in the Earth, lamb waves moving across a structure, or optical signals propagating through a fiber. Without accounting for morphing of the original signal, the arrival time estimates can be significantly off which leads to an erroneous source location. Moreover, these conventional methods are computationally intensive and require a significant amount of computational time. That limits their ability to be implemented on certain systems. Thus, it would be beneficial to have methods that could account for signal morphing to produce more accurate arrival time estimations while minimizing the computational requirements of an apparatus or system implementing those techniques.

SUMMARY OF THE INVENTION

One or more the above limitations may be diminished by structures and methods described herein.

In one embodiment, a method is provided. A plurality of signals recorded by a plurality of sensors, respectively, are received at a controller. The number of the plurality of sensors is three or more. The plurality of signals recorded by the plurality of sensors are generated in response to a signal emitted by a source. The plurality of signals are converted into a plurality of probability density functions. A cumulative distribution transform for each of the plurality of probability density functions is calculated. A time delay for each unique pair of the plurality of sensors is calculated by minimizing a Wasserstein distance between two cumulative distribution transforms corresponding to the unique pair of the plurality of sensors.

In another embodiment, an apparatus is provided. The apparatus includes a controller and a memory communicatively connected to the controller and storing a control program. The controller and memory are configured to: receive a plurality of signals recorded by a plurality of sensors, respectively, wherein a number of the plurality of sensors is three or more, and wherein the plurality of signals recorded by the plurality of sensors are generated in response to a signal emitted by a source; convert the plurality of signals into a plurality of probability density functions; calculate a cumulative distribution transform for each of the plurality of probability density functions; and calculate a time delay for each unique pair of the plurality of sensors by minimizing a Wasserstein distance between two cumulative distribution transforms corresponding to the unique pair of the plurality of sensors.

In yet another embodiment, a system for source localization is provided. The system includes a plurality of sensors each configured to record a signal emitted by a source and a controller. The controller is configured to: receive a plurality of signals recorded by a plurality of sensors, respectively, wherein a number of the plurality of sensors is three or more, and wherein the plurality of signals recorded by the plurality of sensors are generated in response to a signal emitted by a source; convert the plurality of signals into a plurality of probability density functions; calculate a cumulative distribution transform for each of the plurality of probability density functions; and calculate a time delay for each unique pair of the plurality of sensors by minimizing a Wasserstein distance between two cumulative distribution transforms corresponding to the unique pair of the plurality of sensors.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are systems and methods for estimating time delay.

Figure 1:
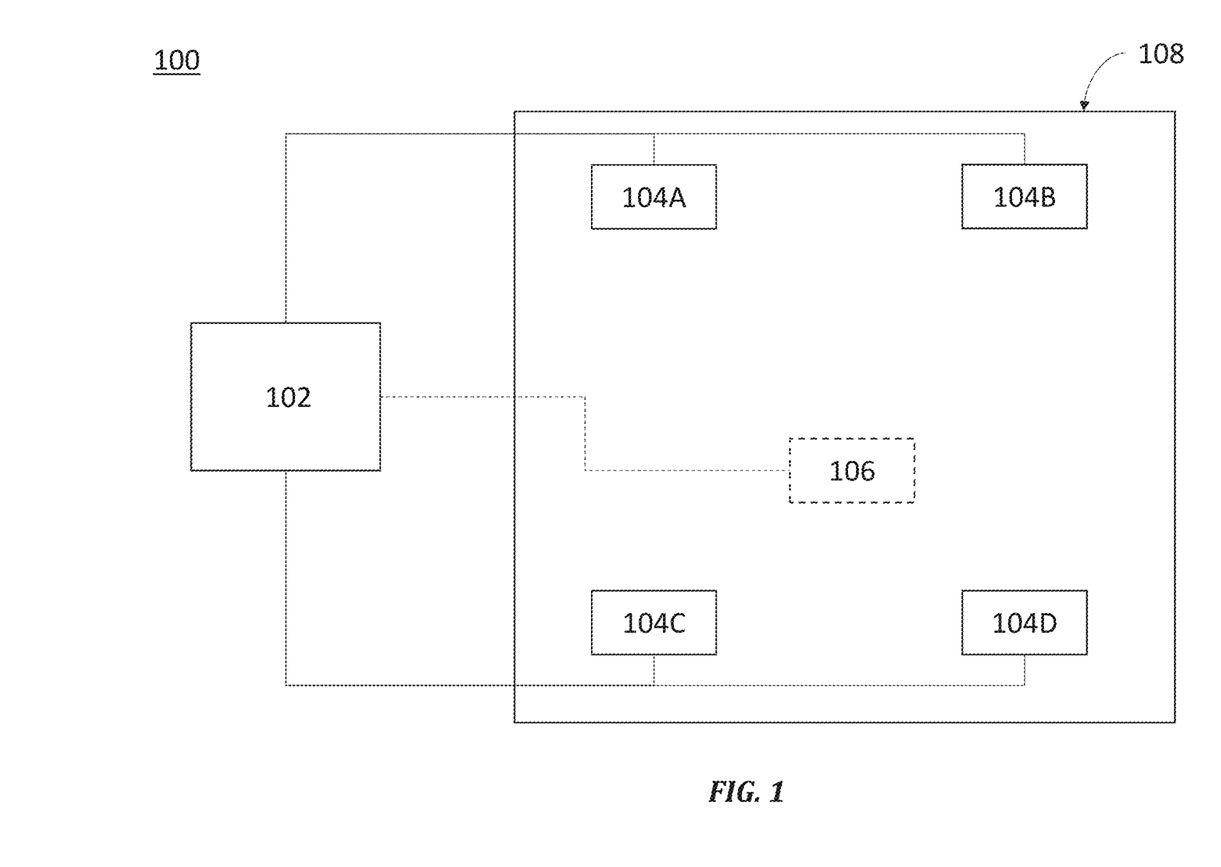
FIG. 1 is a plan view of a system 100 for time delay estimation.

FIG. 1 is a perspective view of an exemplary system 100 for estimating time delays and determining a source location. A controller 102 is communicatively connected to a plurality of sensors 104A, 104B, 104C, and 104D, generically referred to as 104_i below. Controller 102 may be a computer comprising a processor and memory with the memory storing a control program that, when executed by the processor, provides for overall control of system 100 and allows the processor to perform the techniques described below. Controller 102 may also be a microcontroller or microprocessor communicatively connected to memory that, again, stores a control program that provides for overall control of system 100 and allows the processor to perform the techniques described. As discussed below in more detail, the techniques disclosed herein result in significant computational savings compared to previous techniques while yielding more accurate time delay estimations. The techniques are not limited to a particular application, but rather represent a software-based improvement to the systems that perform time delay estimation. With these techniques, those systems are now capable of determining time delays more efficiently and with greater accuracy. These techniques can be applied to a variety of different hardware that are used for time delay estimation and source location for different applications to improve that hardware's performance.

Controller 102 is constructed to receive signals from the plurality of sensors 104A-D. Sensors 104A-104D may be fiber laser acoustic sensors or piezo-electric acoustic emission sensors or another sensor that is configured to record signals propagating through or on a medium. Sensors 104A-104D are distributed in or on a medium 108 in such a manner as to detect signals traversing on or through the medium 108. The signal traversing through on or through the medium 108 is created by a source 106. Depending on the application, source 106 may be an artificial source (e.g., a signal generator like a piezoelectric transducer) or a naturally occurring source (e.g., a seismic event or crack formation in a material). If source 106 is an artificial source, then it may be communicatively connected to controller 102 so as to send and/or receive instructions from controller 102. For example, controller 102 may send a signal to the piezoelectric transducer to emit a signal through or on medium 108 in accordance with a supplied waveform.

Regardless of whether the source 106 is an artificial source or a naturally occurring source, each of sensors 104A-104D are constructed to transmit the signals they record to controller 102 for processing. While four sensors 104A-104D are shown in FIG. 1 that configuration is merely exemplary. As one of ordinary skill in the art will recognize three or more sensors could be used. While a greater number of sensors may provide a more accurate determination of the source location there is a price to be paid in terms of cost and setup. Having described a general system 100 for time delay estimation, attention will now be directed to controller 102 and the manner in which controller 102 processes the signals received from the plurality of sensors 104A-104D.

In general, in an exemplary embodiment, controller 102 analyzes the received signals and calculates a plurality of time delays corresponding to the time difference of arrivals (TDOA, represented as $\tau$) for each unique pair of sensors. As one of ordinary skill will appreciate, a signal emitted by a source 106 does not, generally, arrive at the plurality of sensors at the same time. For example, in FIG. 1, source 106 may emit a signal that propagates on or through medium 108; but since source 106 is located closer to sensor 104C then sensor 104A, the signal will arrive at sensor 104C before it arrives at sensor 104A. The difference between when the signal arrives at sensor 104A and when the signal arrives at sensor 104C is expressed as a time delay $\tau_{104A\text{-}104C}$ which is shortened herein to $\tau_{AC}$. For the four sensors 104A-104D, six time delays are calculated: $\tau_{AB}$, $\tau_{AC}$, $\tau_{AD}$, $\tau_{BC}$, $\tau_{BD}$, and $\tau_{CD}$. Controller 102 is configured to use these time delays to calculate the location of the source 106, as explained below. The accuracy of the estimated source location depends upon the accuracy of the time delay calculations.

As mentioned above, medium 108 morphs the signal emitted by source 106. Conventional approaches to calculating time delays do not account for that morphing and, as demonstrated below, result in inaccurate estimations of the source location. Unlike the conventional approaches, controller 102 approaches the problem by considering how much a signal recorded by one of the sensors would have to change to make it equivalent to a signal recorded by another sensor, as a function of time delay. For most physical systems, the medium 108 will act as a minimum energy transformation so the true delay between when two sensors receive a signal emitted by the source will coincide with a minimal 2-Wasserstein distance. As one of ordinary skill will appreciate, the Wasserstein metric or distance is a distance function defined between probability distributions on a given metric space. Intuitively, the Wasserstein distance can be understood as the cost of turning one pile of dirt into another pile of dirt. In terms of signals, the minimal Wasserstein distance represents the minimum amount of "effort" (quantified as signal intensity times distance) required to transform one signal into another signal. In addition to time delay, signal morphing may result in both linear and quadratic dispersion. Discussed below are techniques for calculating time delays with and without accounting for dispersion.

Turning first to estimating time delays without accounting for dispersion, the minimal Wasserstein distance is computed by minimizing the norm of the difference in cumulative distribution transforms (CDT) between two signals recorded by two sensors, respectively. However, as explained below, the norm of the difference in CDTs between the two signals can be reduced to a simple center of mass computation in this instance.

Figure 2:
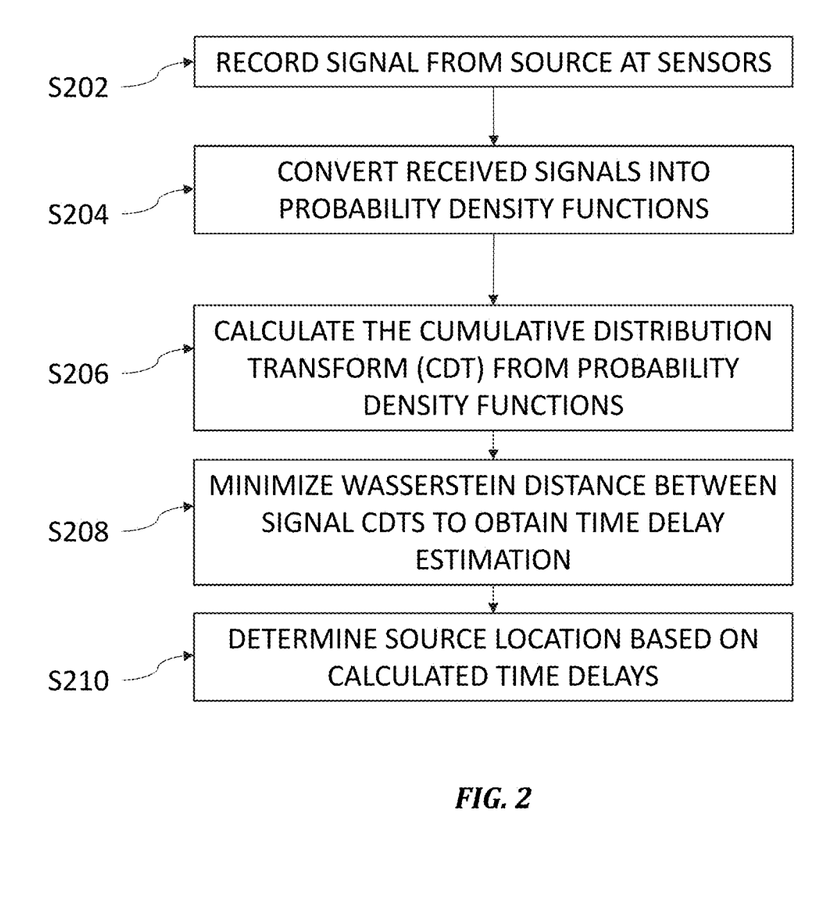
FIG. 2 is flowchart illustrating the steps in a method for source localization according to one embodiment.

FIG. 2 illustrates the steps involved in source localization based on time delays calculated via Wasserstein distance minimization both when accounting for dispersion and when dispersion is not accounted for. First, in S202, the plurality of sensors 104' record signals transmitted through or on medium 108 from source 106. The plurality of recorded signals $z_{104A}(t)$, $z_{104B}(t)$, $z_{104C}(t)$ and $z_{104D}(t)$ (generically $z_{104i}(t)$ where i represents one of A-D) are then transmitted to controller 102. Next, in S204, the received signals $z_{104A}(t)$ ... $z_{104D}(t)$ are digitally sampled and normalized to convert them into probability density functions (PDFs). Given that $z_{104i}(t)$ is a time-domain signal, a corresponding PDF is given by Equation 1 below:

$$s_{104i}(t) = \frac{|z_{104i}(t) + \epsilon|}{\int_{\Omega_z} |z_{104i}(t) + \epsilon| dt}$$

where $\epsilon > 0$ is a small offset parameter (so that resulting signals are positive) and $|s|_{l_1} = \int_{\Omega_s} |s_{104i}(t)| dt$ is the standard $l_1$ norm. By Equation 1, controller 102 transforms each of the received signals $z_{104i}(t)$ into a positive signal and normalizes them such that the integral of their respective absolute values equals 1. This effectively transforms each received signal $z_{104i}(t)$ into a corresponding 1D PDF, $s_{104i}(t)$. With a plurality of PDFs $s_{104A}(t) \ldots s_{104D}(t)$ respectively corresponding to the plurality of signals $z_{104A}(t) \ldots s_{104D}(t)$, the next step is to use those PDFs to calculate the plurality of time delays $\tau_{AB}$, $\tau_{AC}$, $\tau_{AD}$, $\tau_{BC}$, $\tau_{BD}$, and $\tau_{CD}$. For simplicity, the discussion below will focus on how two generic PDFs $s_{104j}(t)$ and $s_{104k}(t)$ are used to calculate a time delay ($\tau_{JK}$) between when two sensors $104_j$ and $104_k$ receive the emitted signal. Sensors $104_j$ and $104_k$ could be any of sensors 104A-104D. In order to keep the notation simple, the two generic PDFs $s_{104j}(t)$ and $s_{104k}(t)$ will be labelled s and r, respectively. The Wasserstein time delay estimate can be defined as the solution of the following optimization problem:

$$\min_{\tau} W^2(s_\tau, r)$$

Where $W(\cdot,\cdot)$ is the Wasserstein distance between PDFs s and r, given by Equation 2 below:

$$W^2(s_\tau, r) = \inf_f \int |f(u) - u|^2 r(u) du$$

with inf standing for the infimum operation, such that Equation 3 is:

$$\int_{\inf(\Omega_{s_\tau})}^{f(x)} s_\tau(u) du = \int_{\inf(\Omega_r)}^{x} r(u) du$$

In one dimension, there exists only one function $f$ that satisfies Equation 3 above, and thus the optimum $f$ defined by Equation 2 is found by solving the integral in Equation 3.

One way to analyze the solution to the Wasserstein time delay estimation posed above is through the use of the cumulative distribution transform recently introduced in "*The Cumulative Distribution Transform and Linear Pattern Classification*" by Se Rim Park et al., Applied and Computational Harmonic Analysis 2017, the contents of which are incorporated by reference herein in its entirety. Let $s_0(t)$, $t \in \Omega_0$ define a positive reference probability density function (i.e. $s_0 > 0$ and $\omega_{\Omega_0} s_0(t) dt = 1$). Note that while in probability theory a PDF $p(x)$ will possess units $1/x$, the normalized signals $s$, $s_0$ are dimensionless. Let $f_s$ correspond to the $1/x$ map such that (Equation 4):

$$\int_{\inf(\Omega_s)}^{f_s(x)} s(u) du = \int_{\inf(\Omega_r)}^{x} s_0(u) du$$

The forward (analysis) Cumulative Distribution Transform (CDT) of signal s is then defined as (Equation 5):

$$\hat{s} = (f_s - Id)\sqrt{s_0}$$

with $Id(t) = t$ the identity function. Moreover, the inverse (synthesis equation) transform can be written as (Equation 6):

$$s = (f_s^{-1})'(s_0 \circ f_s^{-1})$$

with $f_s^{-1}(f(t)) = t$ and $s_0 \circ f_s^{-1}(t) = s_0(f_s^{-1}(t))$. The CDT maps continuous functions to the space of 1D diffeomorphisms, and vice versa. Using the forward CDT transformation above, it then becomes clear that $W^2(s, s_0) = \|\hat{s}\|_{l_2}^2$. It can be shown that the Wasserstein distance between the PDFs s and r is given by Equation 7 below, where $\hat{s}$ and $\hat{r}$ are the CDTs of PDFs s and r, respectively:

$$W_2^2(s_v, r) = \|\hat{s} - \hat{r}\|_{l_2}^2$$

This means that for 1D signals which are PDFs, the CDT naturally embeds the Wasserstein distance. The CDT translation theorem states that a shift along the independent variable (i.e., shifts in time (t−r)) become a shift in the dependent variable in the transform domain. This means that the Wasserstein distance becomes (Equation 8):

$$W_2^2(s, r) = \|\hat{s} - \hat{r} + \Sigma\|_{l_2}^2$$

The Wasserstein formulation of the time delay estimation is thus a convex function of the shift parameter $\tau$ (when dispersion is not accounted for). The closed form minimizer for the Wasserstein cost function between the positive signals is given by Equation 9 below:

$$\tau_{JK} = \frac{1}{|\Omega_{s_0}|} \int_{\Omega_{s_0}} [\hat{s}(u) - \hat{r}(u)] du = \mu_s - \mu_r$$

By Equation 9, the Wasserstein minimization-based time delay estimate between two sensors $104_j$ and $104_k$ ($\tau_{jk}$) can be obtained via minimization of the Wasserstein distance between signals s and r by subtracting the center of masses of s and r, $\mu_s$ and $\mu_r$, respectively. The center of masses of s and r are obtained by Equations 10 and 11 below.

$$\mu_s = \sum_{i=0}^{N-1} t_i s(t_i) \Delta t$$

$$\mu_r = \sum_{i=0}^{N-1} t_i r(t_i) \Delta t$$

Figure 3A:
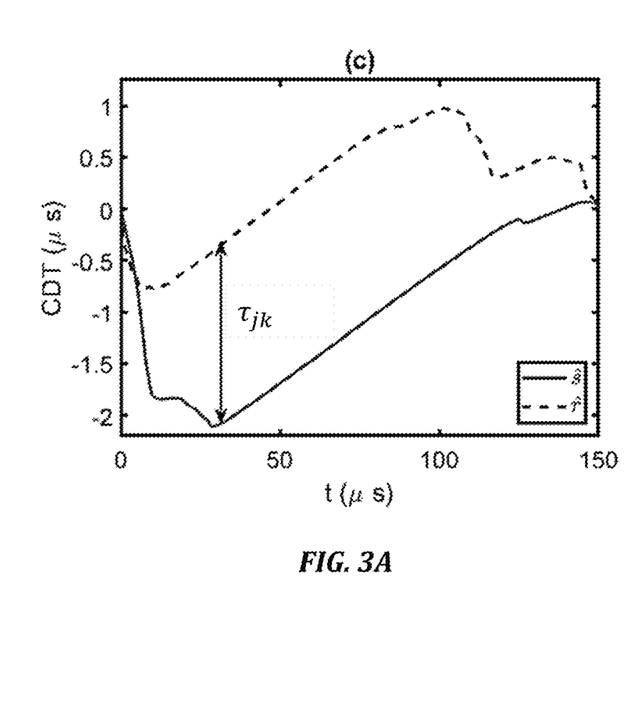
FIG. 3A is a graph illustrating an offset between two cumulative distribution functions.
Figure 3B:
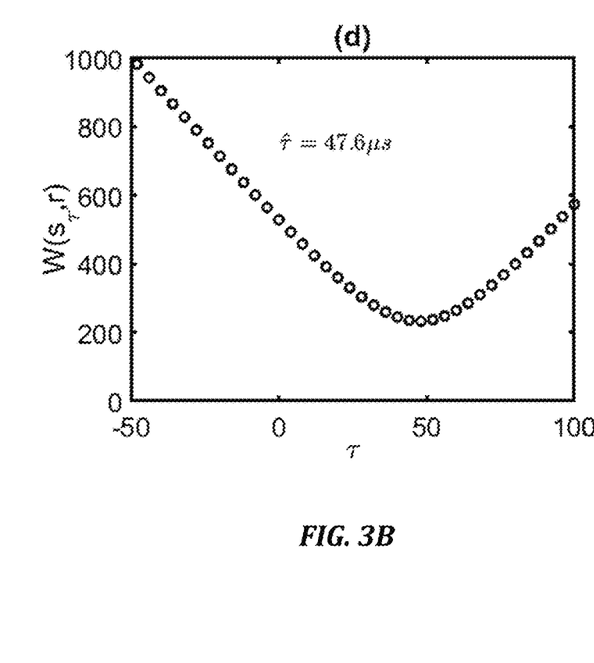
FIG. 3B is a graph of the Wasserstein distance between two functions as a function of time delay.

In Equations 10 and 11 above, $t_i = i\Delta t$ and $i = 0, \ldots, N-1$ correspond to the sampling times with $\Delta t$ being the sampling period. This process is graphically illustrated in FIGS. 3A and 3B. FIG. 3A is a graph of CDTs for signals s and r (for two sensors $104_j$ and $104_k$) as a function of time. The time delay ($\tau_{jk}$) is the constant offset that appears between the two CDT curves. It is self-evident from Equation 8 that the Wasserstein formulation of time delay estimation problem is a convex function of $\tau$ and that is illustrated in FIG. 3B. FIG. 3B is plot of $W^2(s_\tau, r)$ as a function of $\tau$. For this example, the minimum value of $W^2(s_\tau, r)$ corresponds to a time delay of 47.6 μs.

To summarize, in S202 the signals recorded by the plurality of sensors 104A-D are received by controller 102. At this point, signals $s_{104i}(t)$ are in analog form. Controller 102 samples signals $s_{104i}(t)$ to create digital signals. As one of ordinary skill will appreciate, the sampling rate (and thus the sampling period $\Delta t$) will at least satisfy the Nyquist theorem to ensure an accurate digital representation of the analog signals. In S204, controller 102 converts those sampled received signals into PDFs $s_{104A}(t)$ $s_{104D}(t)$ via Equation 1. In the case of the exemplary embodiment shown in FIG. 1 that means that four PDFs are created. Of course, as stated above, three or more sensors 104i may be used depending on the implementation and the number of PDFs created would correspond to the number of sensors deployed. Then, in S206, the cumulative distribution transforms (CDTs) may be determined from the probability density functions. In S208, the Wasserstein distance between the signal CDTs is minimized to obtain the time delay estimation.

In the embodiment described above, that is accomplished by calculating the center of mass of each PDF $s_{104i}(t)$ is found. Next, in S208, for a unique pair of sensors (generically $104_j$ and $104_k$), the time delay between when those sensors receive the emitted signal is calculated by subtracting the center of mass $\mu_j$, corresponding to sensor $104_j$, from the center of mass $\mu_k$, corresponding to sensor $104_k$. This is done for each unique pair of sensors among the plurality of sensors 104. In the exemplary embodiment shown in FIG. 1, there are four sensors 104A-D resulting in six unique pairs ($104_{AB}$, $104_{AC}$, $104_{AD}$, $104_{BC}$, $104_{BD}$, and $104_{CD}$) and six unique time delays ($\tau_{AB}$, $\tau_{AC}$, $\tau_{AD}$, $\tau_{BC}$, $\tau_{BD}$, and $\tau_{CD}$). Having calculated the unique time delays, those time delays are used in S210 to determine the source location, as discussed below. While in the current embodiment, the calculation of the time delay reduces to center of mass operations that is not true for Wasserstein minimizations that account for delay and dispersion, as discussed below. However, whether dispersion is accounted for by the techniques described below, or the time delay is calculated by the technique described above, the next step is to use those time delays for source localization.

In S210, the source of the emitted signal is determined based upon the time delays calculated in S208. An exemplary technique for determining a source location from the time delays is disclosed in "*Positioning Using Time-Difference of Arrival Measurements*", Fredrik Gustafsson and Fredrik Gunnarsson in 2003 *Proceedings of the IEEE International Conference on Acoustics, Speech, and Signal Processing (ICASSP '03)* (IEEE, 20003), Vol. 6, p. VI-533, the contents of which are incorporated by reference herein in their entirety. In brief, the general problem is to solve the non-linear system of K equations (Equation 12 below):

$$\Delta d_{i,j} = h(X, Y; X_i, Y_i, X_j, Y_j), 1 \leq i < j \leq n$$

for a sender position (X, Y) given the receiver positions ($X_i$, $Y_i$). While this equation is shown for a two dimensional case, one of ordinary skill will appreciate that this equation is easily expanded to three dimensions. However, for simplicity, the source localization will discussion will be confined to two dimensions. The non-linear least squares estimate is given by Equation 13 below:

$$(\hat{X}, \hat{Y}) = \arg\min_{(X,Y)} \sum_{i>j} (\Delta d_{i,j} - h(X, Y; X_i, Y_i, X_j, Y_j))^2$$

This equation can be simplified by using P=(X, Y) for the source location, and then rewriting the minimization problem in vector notation using a weighted least squares criterion to yield Equation 14 below:

$$\hat{P} = \arg\min_{P} (\Delta d - h(P))^T R^{-1} (\Delta d - h(P))$$

where $\Delta d = (\Delta d_{1,2}, \ldots \Delta d_{n-1,n})^T$ and $R = \text{Cov}(\Delta d)$ is the covariance matrix for the TDOA measurements. Controller 102 is constructed to solve Equation 14 above to yield the location of the source based on the calculated time delays. Having described the general technique above for estimating time delay (without accounting for dispersion), its advantages over conventional techniques will be discussed below.

Figure 4:
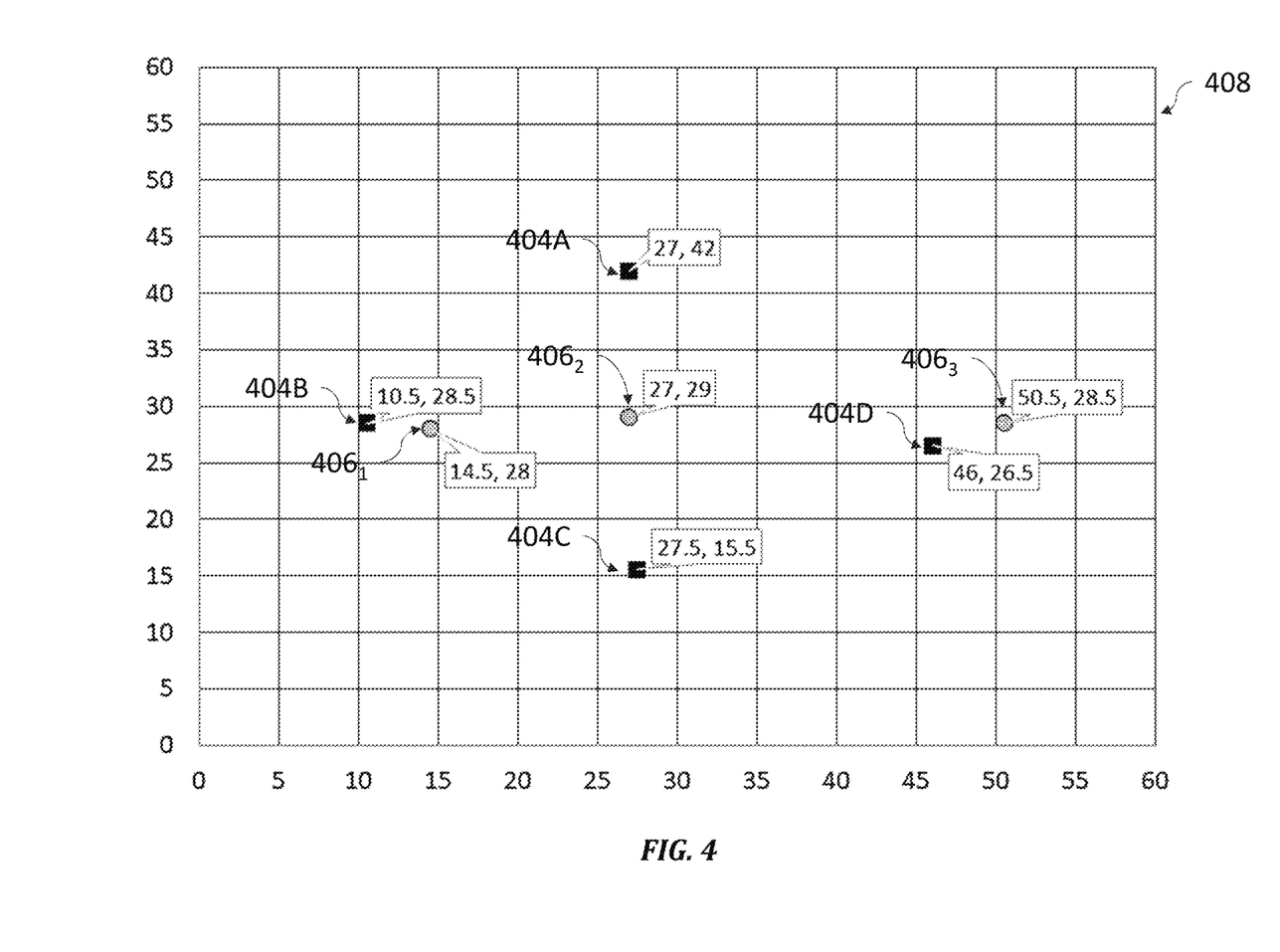
FIG. 4 is a plan view of a plate 408 used in an experiment comparing time delay estimation techniques described herein to conventional approaches.

FIG. 4 is a plan view of an experimental setup 400 that compares time delays calculated by the Wasserstein minimization technique discussed above and time delays calculated by cross-correlation and mutual information techniques. FIG. 4 shows a 60 cm×60 cm, 2.5 mm thick Aluminum plate 408 on which four fiber laser acoustic sensors 404A-404D are mounted with Krytox grease at known locations. Table 1 below shows the locations of sensors 404A-404D.

TABLE 1

| Sensor | Location (X, Y) in centimeters |
|---|---|
| 404A | 27, 42 |
| 404B | 10.5, 28.5 |
| 404C | 27.5, 15.5 |
| 404D | 46, 26.5 |

The locations of sensors 404A-D are also shown in the callouts in FIG. 4. A piezoelectric transducer 406 was supplied with a raised cosine of 70 kHz with five cycles to simulate an acoustic emission event. Transducer 406 was moved to three different locations during the experiment, as indicated by $406_1$, $406_2$, and $406_3$, in FIG. 4. At each source location $406_1$, $406_2$, and $406_3$, transducer 406 was triggered by a controller (not shown) and the emitted signal was subsequently recorded by sensors 404A-D at 10 MS/s with a record length of 400 μs. The waveforms received at the sensors 404A-D are morphed by distortion due to structural resonances, reverberations, noise and dispersion, among other factors.

Table 2 below shows calculated values for each of the six unique pairs of sensor time delays $\tau_{AB}$, $\tau_{AC}$, $\tau_{AD}$, $\tau_{BC}$, $\tau_{BD}$, and $\tau_{CD}$, in microseconds. Those values were calculated by the following methods: (i) prediction based on the known positions of the sensors 404A-D, the source 406, and the calculated group velocity of 5398 m/s; (ii) cross-correlation (XC), (iii) mutual information (MI), and (iv) Wasserstein distance minimization (Wass.) as discussed above.

TABLE 2

Predicted vs. Estimated Delays For a 70 kHz Lamb Wave with Four Sensor Locations

| Source Location | Time Delay | Predicted | XC | MI | Wass. |
|---|---|---|---|---|---|
| X = 50.5 (cm) | $\tau_{AB}$ | 23.89 | 99.2 | 40.2 | 25.1 |
| Y = 28.5 (cm) | $\tau_{AC}$ | −1.26 | −1.3 | −1.1 | −2.5 |
| | $\tau_{AD}$ | −41.08 | −72.1 | −72.3 | −48.7 |
| | $\tau_{BC}$ | −25.15 | −39.2 | −40.4 | −22.6 |
| | $\tau_{BD}$ | −64.97 | −47.1 | −100.0 | −71.2 |
| | $\tau_{CD}$ | −39.82 | −70.4 | −70.5 | −46.5 |
| X = 27 (cm) | $\tau_{AB}$ | 6.49 | 4.9 | 4.5 | 8.0 |
| Y = 29 (cm) | $\tau_{AC}$ | 0.94 | 7.1 | 6.2 | 2.5 |
| | $\tau_{AD}$ | 11.41 | 26.0 | 25.7 | 14.2 |
| | $\tau_{BC}$ | −5.55 | 1.7 | 1.4 | −5.3 |
| | $\tau_{BD}$ | 4.92 | 21.2 | 22.0 | 5.3 |
| | $\tau_{CD}$ | 10.47 | 19.1 | 20.6 | 12.3 |
| X = 14.5 (cm) | $\tau_{AB}$ | −27.30 | −41.7 | −42.0 | −24.7 |
| Y = 28 (cm) | $\tau_{AC}$ | −1.35 | 0.2 | 0.0 | 1.5 |
| | $\tau_{AD}$ | 23.65 | 40.1 | 40.0 | 34.1 |
| | $\tau_{BC}$ | 25.94 | 43.0 | 42.9 | 26.0 |
| | $\tau_{BD}$ | 50.95 | 82.3 | 82.8 | 56.7 |
| | $\tau_{CD}$ | 25.01 | 40.2 | 41.6 | 32.2 |

It is self-evident from Table 2 that the Wasserstein estimates for the time delays $\tau_{ij}$ are consistently closer to the predicted values than either the cross-correlation or mutual information approaches. If one proceeds to estimate the source location based on the time delays $\tau_{ij}$ shown in Table 2, it should be no surprise that the source location predicted using the Wasserstein time delays are closer to the true value than other predicted locations that were determined using one of the other methods. This is illustrated in Table 3 below.

TABLE 3

Source Location Accuracy Based on Six Estimates of Time Delay and Unit-Less Error Relative to Calculated Cramer-Rao Lower Bound

| | Truth | | XC | | | Wasserstein | | |
|---|---|---|---|---|---|---|---|---|
| Test | X | Y | X | Y | e/Cr | X | Y | e/Cr |
| 1 | 50.5 | 28.5 | 48.41 | 20.42 | 9.8 | 46.9 | 24.75 | 6.11 |
| 2 | 27 | 29 | 22.15 | 30.14 | 55.3 | 24.94 | 29.42 | 23.3 |
| 3 | 14.5 | 28 | 0 | 46.46 | 235 | 17.46 | 35.08 | 76.7 |

Table 3 shows the estimated source location obtained using both XC and Wasserstein approaches to delay estimation, along with the true location. The MI estimator yields roughly the same localization accuracy as the XC and was therefore excluded from Table 3. The Wasserstein approach disclosed above was consistently able to provide better location estimates in this experimental application. The Cramer-Rao lower bound (CRLB) for this source localization problem which accounts for temporal sampling errors in time difference of arrival was also computed using Eqn. (A.5). in "*Acoustic emission localization in plates with dispersion and reverberations using sparse pzt sensors in passive mode*" A. Perelli et al., Smart Materials and Structures 21(2):025010 (2012), the contents of which are incorporated by reference herein in their entirety. The CRLB is predicted to be higher near the edges of the plate and lower in the center. The error relative to the CRLB is provided in Table 3 and demonstrates the improvement of the Wasserstein approach over both the XC and, by extension, MI approaches. However, because the CRLB model does not include the full plate dynamics (including any nonlinearities), the CRLB is much lower (order mm near the center) than the observed errors (order cm).

In addition to being more accurate to conventional approaches (XC and MI) to time delay estimation, the Wasserstein approach discussed above is also better at accounting for noise. For a 1D-type minimization problem, such as the ones discussed above, one may assume a uniform noise distribution for the random variable $\alpha(t)=s(t)-r(t)$. Irrespective of the number of time samples N, the expected value of the $L_2$ distance is expected to be large: $\text{Ellis}\{\|s-r\|_{L_2}\} \sim O(1)$, whereas for the Wasserstein case we have that $E\{W^2(s,r)\}=O(1/N)$.

Still further, the center of masses computations described above are computationally cheap to compute. Solving Equations 10 and 11 for $\mu_s$ and $\mu_r$, requires only 2×N floating point operations. This makes the Wasserstein approach disclosed herein far more computationally efficient than the traditional, and less accurate, XC and MI approaches. This means that it is the operation of controller 102 that is improved by using the Wasserstein approach described herein. The present invention is not directed to using TDOA to find the location of any particular source or solve any particular problem, but rather to an improvement in the way a controller calculates TDOAs by processing the received signals using the Wasserstein approach which yields a more accurate result in less computational time. The particular type of source that is being located is irrelevant. The source may be a seismic event, an acoustic emission stemming from the cracking of a plate, a signal for a positioning system etc., or any other source whose position needs to be determined based on received signals. The key aspect of the present invention is to use the Wasserstein approach described above to improve controller's 102 ability to locate any type of source by making the source localization process more accurate and less computationally intense relative to conventional approaches. The present invention can be thought of as a software-based improvement to computer technology; specifically, apparatuses and systems for performing source localization.

Having described the Wasserstein approach and demonstrated its improved capabilities relative to conventional techniques, attention will now be directed to using the Wasserstein approach described above to locate the source of an exemplary acoustic emission event. The acoustic emission event in this example is caused by the cracking of a plate under load. However, as mentioned above, the present invention is not limited to using the Wasserstein approach to calculate the location of an acoustic emission event, but rather to improvements in the underlying technology of source localization. Thus, the example described below is merely one instance of a source localization problem that will benefit from the technological improvements brought about by using the Wasserstein approach described herein. As one skilled in the art will recognize, the Wasserstein approach described herein can be used to improve the accuracy and speed of locating any source, not just a crack in a plate.

Figure 5:
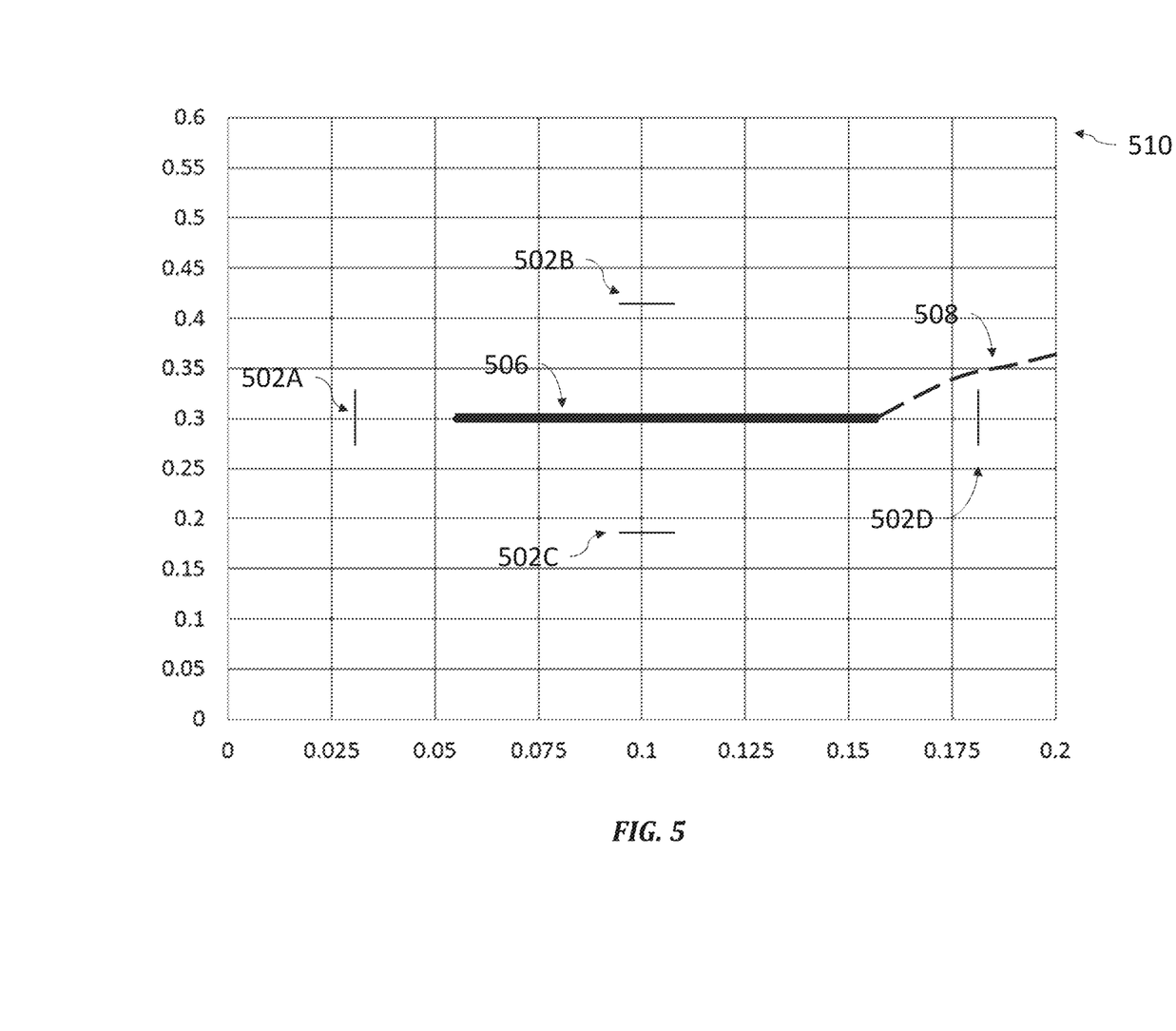
FIG. 5 is a plan view of a plate 510 and a plurality of sensors mounted thereon which are used to determine the location of a crack in plate 510.
Figure 6:
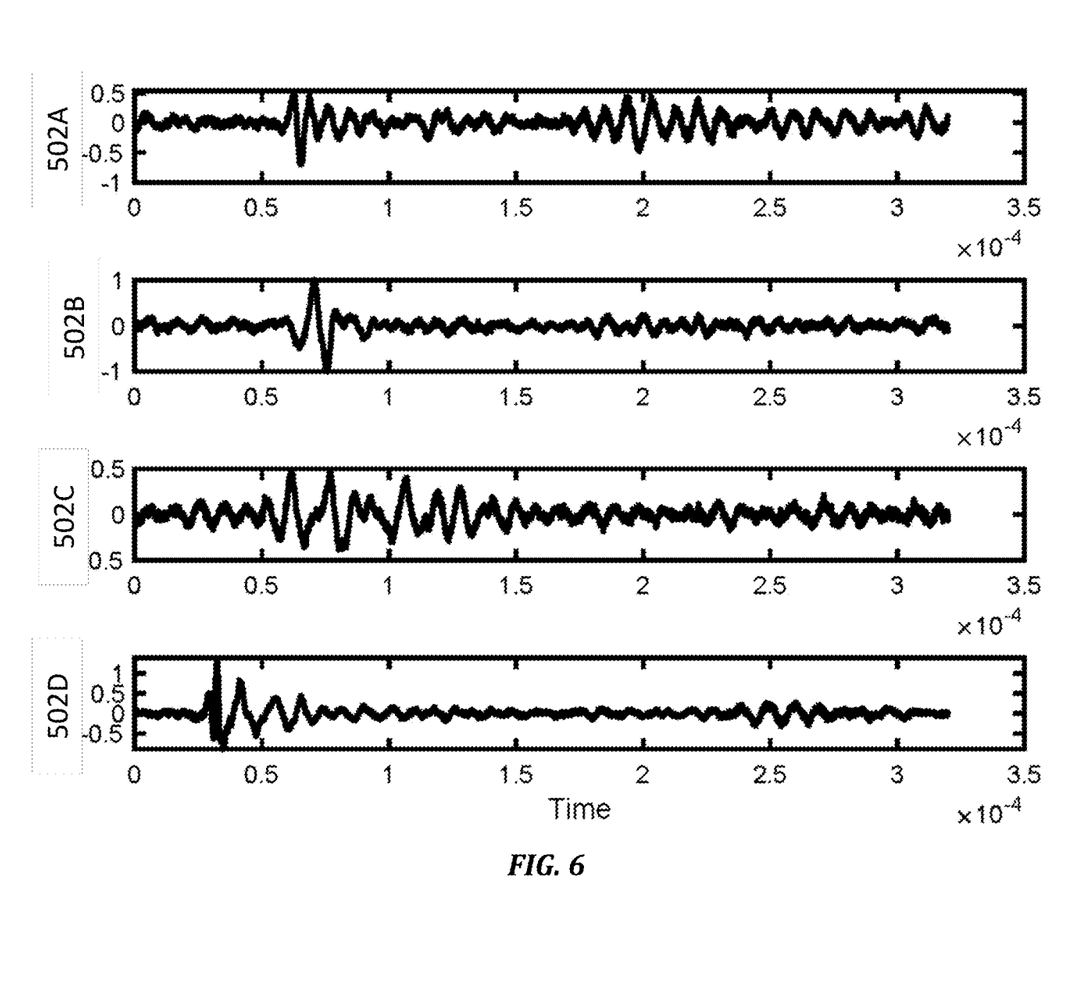
FIG. 6 is a graph of signals recorded by the plurality of sensors mounted on plate 510.
Figure 7:
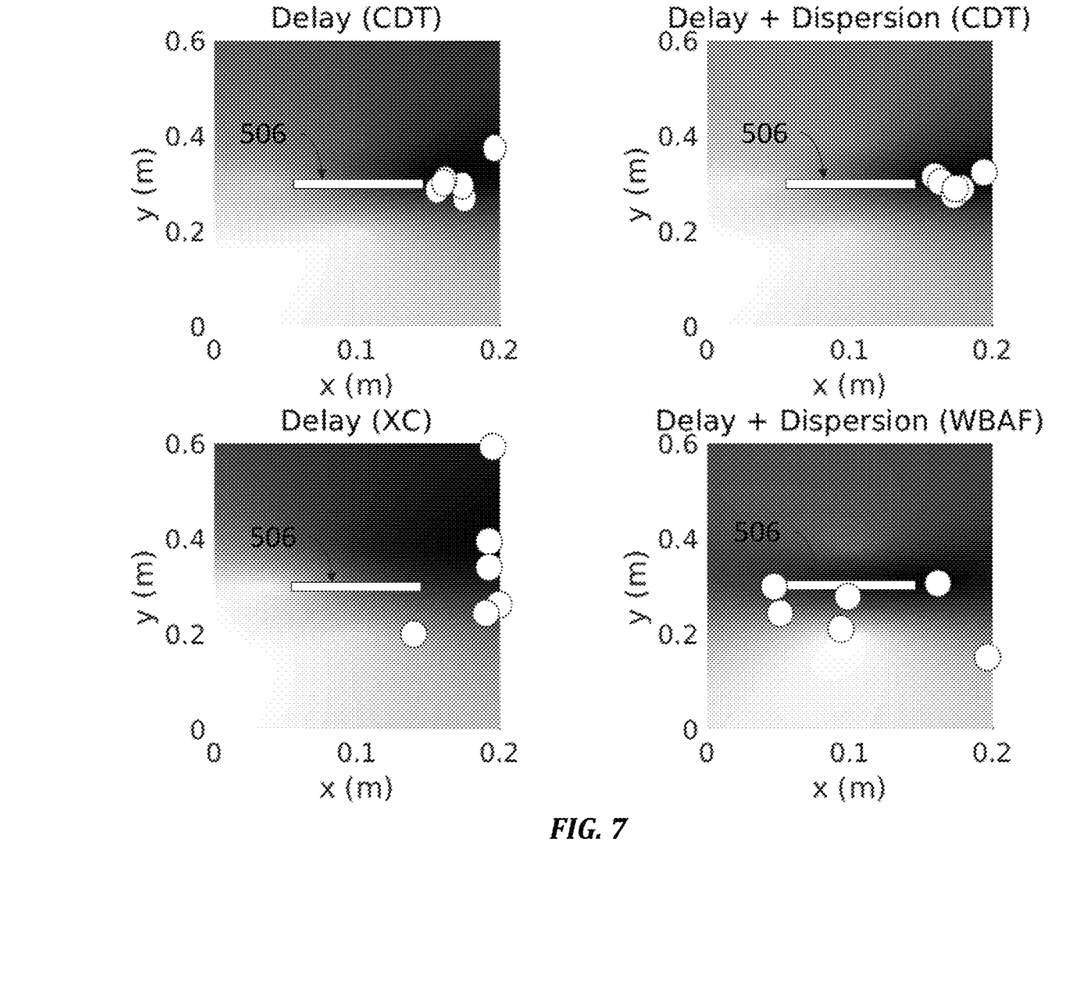
FIG. 7 illustrates source locations calculated by techniques described herein and conventional approaches.

FIG. 5 is a plan view of an 20×60 cm Aluminum plate 510 that is 6.4 mm thick. Plate 510 has a pre-milled channel 506 with notches at its end to control the location of initial cracking. Plate 510 is mounted in a hydraulic uni-axial load test frame material testing system (MTS) that applies a load to plate 510. Attached to plate 510 are a plurality of sensors 502A-D that are constructed to receive signals transmitted on or through plate 510. The MTS applies a load to plate 510 until a crack 508 is formed. Crack formation is acoustic emission event that causes a Lamb wave to propagate from the crack and which is recorded by sensors 502A-D. The signals recorded by sensors 502A-D and are shown in FIG. 6. These signals can be used to calculate time delay estimates. Those estimates may be calculated by the technique described above in which dispersion is ignored, or by the techniques described below in which both delay and dispersion are accounted (see Equation 18 below). FIG. 7 shows the results of source localization corresponding to calculations based on (i) Wasserstein time delay only, (ii) Wasserstein time delay and dispersion, (iii) cross-correlation (XC), and (iv) Wide-band Ambiguity Function (WBAF) time delay and dispersion. The white dots in FIG. 7 represent the estimated source locations. It is self-evident from FIG. 7 that the Wasserstein based approaches described above and below outperform the others and more closely show the location of crack 508 (shown in FIG. 5).

Discussed above is a Wasserstein approach to calculating time delays, but that approach does not account for dispersion (either linear or quadratic) that occurs due to signal morphing. A modification of the Wasserstein approach to account for dispersion will now be discussed. Turning first to the case of linear dispersion, if $\hat{s}$ and $\hat{r}$ are the CDTs of PDFs s and r, respectively, then $W_2^2(s_\tau,r)=\|\hat{s}-\hat{r}\|_{l_2}^2$. And if $\hat{s}$ is the CDT of signal s, then the CDT of the signal $g'_p s^\circ g_p$ is given by $g^{-1} \circ \hat{s}$. Simply stated, the CDT composition theorem says that shifts along the independent variable (i.e., shifts in time t−τ) become a shift in the dependent variable in transform domain. By the above, the cost function given by Equation 2 above, becomes Equation 15 below:

$$W^2(g's \circ g, r) = \|g^{-1} \circ \hat{s} - \hat{r}\|_{\ell_2}^2$$

It is clear that when $g^{-1}$ can be written as a function that acts linearly on $\hat{s}$, the problem above is a linear least squares problem. For dispersion estimation, we have that $g(t)=\omega t$, and thus Equation 16 is:

$$W^2(g's \circ g, r) = \left\|\frac{1}{\omega}\hat{s} - \hat{r}\right\|_{\ell_2}^2$$

The minimizer for Equation 16 (following linear least squares on $1/\omega$) is given by Equation 17 below:

$$\omega = \frac{\|\hat{s}\|_{\ell_2}^2}{<\hat{r}, \hat{s}>_{\ell_2}}$$

Equation 17 provides a solution for linear dispersion, but the Wasserstein approach can also be used to solve for time delay and dispersion. The estimation technique selects a time delay τ and dispersion co as the parameters that minimize the Wasserstein distance between $\tilde{r}(t)$ and $s_g(t) \equiv g'(t)\tilde{s}(g(t))$, where $\tilde{r}(t)$ and $\tilde{s}(t)$ are the two measured, normalized signals for which we want to find the TDOA. $s_g(t)$ is the modeled signal (acted on by g(t) to "undo" the modification of the signal due to signal propagation through the material). In that instance, we have $g(t) \equiv \omega t + \tau$ which incorporates both delay and dispersion into the model. This form is chosen when the time delay is sought and it is known that dispersion affects signal transmission. In view of the above, $g^{-1}(t) = \alpha t + \beta$, with $\alpha = 1/\omega$ and $\beta = \tau/\omega$. Thus, Equation 18 is:

$$W^2(g's \circ g, r) = \|\alpha \hat{s} + \beta - \hat{r}\|_{\ell_2}^2$$

Once again, this is a linear least squares problem on α and β from which co and τ can be recovered. The problem is convex and closed form.

In addition to accounting for time delay and linear dispersion, the Wasserstein approach can also be used to account for quadratic dispersion. In that case, $g(t)=\omega t^2$, so $g^{-1}(t)=1/\sqrt{\omega}\sqrt{t}$. Consequently, Equation 19 is:

$$W^2(g's \circ g, r) = \|\alpha\sqrt{\hat{s}} - \hat{r}\|_{\ell_2}^2$$

With $\alpha = 1/\sqrt{\omega}$. Again there is convexity with the solution being given by Equation 20 below:

$$\omega = \frac{<\sqrt{\hat{s}}, \sqrt{\hat{s}}>}{<\hat{r}, \sqrt{\hat{s}}>_{\ell_2}}$$

This problem is again convex and closed form. By the above techniques, not only are more computationally efficient techniques for time delay provided, but those techniques improve the accuracy of controllers and the like by accounting for effects from signal morphing (e.g., dispersion) caused by the medium. These techniques are a significant improvement in the hardware used for calculating time delays and by extension source location, and are applicable to the multitude of applications where calculating a source location is needed.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method, comprising:
receiving, at a controller, a plurality of signals recorded by a plurality of sensors, respectively, wherein a number of the plurality of sensors is three or more, and wherein the plurality of signals recorded by the plurality of sensors are generated in response to a signal emitted by a source;
converting the plurality of signals into a plurality of probability density functions;
calculating a cumulative distribution transform for each of the plurality of probability density functions; and
calculating a time delay for each unique pair of the plurality of sensors by minimizing a Wasserstein distance between two cumulative distribution transforms corresponding to the unique pair of the plurality of sensors.

2. The method of claim 1, further comprising:
determining a location of the source based on the calculated time delays.

3. The method of claim 1, further comprising:
transmitting, from the controller, a start signal to the source to cause the source to emit the signal emitted by the source.

4. The method of claim 1, wherein the source is an artificial source.

5. The method of claim 1, wherein the source is a naturally occurring source.

6. The method of claim 1, further comprising:
calculating a linear dispersion corresponding to a morphing of the signal emitted by the source as it propagates through a medium.

7. The method of claim 1, further comprising:
calculating a quadratic dispersion corresponding to a morphing of the signal emitted by the source as it propagates through a medium.

8. An apparatus, comprising:
a controller; and
a memory communicatively connected to the controller and storing a control program, wherein the controller and the memory are configured to:

receive a plurality of signals recorded by a plurality of sensors, respectively, wherein a number of the plurality of sensors is three or more, and wherein the plurality of signals recorded by the plurality of sensors are generated in response to a signal emitted by a source;

convert the plurality of signals into a plurality of probability density functions;

calculate a cumulative distribution transform for each of the plurality of probability density functions; and calculate a time delay for each unique pair of the plurality of sensors by minimizing a Wasserstein distance between two cumulative distribution transforms corresponding to the unique pair of the plurality of sensors.

9. The apparatus of claim 8, wherein the controller and the memory are further configured to determine a location of the source based on the calculated time delays.

10. The apparatus of claim 8, wherein the controller and the memory are further configured to transmit a start signal to the source to cause the source to emit the signal emitted by the source.

11. The apparatus of claim 8, wherein the controller and the memory are further configured to calculate a linear dispersion corresponding to a morphing of the signal emitted by the source as it propagates through a medium.

12. The apparatus of claim 8, wherein the controller and the memory are further configured to calculate a quadratic dispersion corresponding to a morphing of the signal emitted by the source as it propagates through a medium.

13. A system for source localization, comprising:
a plurality of sensors each configured to record a signal emitted by a source;
a controller configured to:
receive a plurality of signals recorded by a plurality of sensors, respectively, wherein a number of the plurality of sensors is three or more, and wherein the plurality of signals recorded by the plurality of sensors are generated in response to a signal emitted by a source;

convert the plurality of signals into a plurality of probability density functions;

calculate a cumulative distribution transform for each of the plurality of probability density functions; and calculate a time delay for each unique pair of the plurality of sensors by minimizing a Wasserstein distance between two cumulative distribution transforms corresponding to the unique pair of the plurality of sensors.

14. The system of claim 13, wherein the controller is further configured to determine a location of the source based on the calculated time delays.

15. The system of claim 13, wherein the controller is further configured to transmit a start signal to the source to cause the source to emit the signal emitted by the source.

16. The system of claim 13, wherein the controller is further configured to calculate a linear dispersion corresponding to a morphing of the signal emitted by the source as it propagates through a medium.

17. The system of claim 13, wherein the controller is further configured to calculate a quadratic dispersion corresponding to a morphing of the signal emitted by the source as it propagates through a medium.

* * * * *